(12) United States Patent
Sasaki et al.

(10) Patent No.: US 7,385,892 B2
(45) Date of Patent: Jun. 10, 2008

(54) RECORDING MEDIUM, INFORMATION RECORDING APPARATUS, INFORMATION RECORDING METHOD, INFORMATION RECORDING MEDIUM, AND RECORDING PROGRAM

(75) Inventors: Yoshio Sasaki, Tokorozawa (JP);
Satoshi Uchiumi, Tokorozawa (JP);
Hirohisa Tsudome, Tokorozawa (JP);
Kunio Matsumoto, Tokorozawa (JP);
Eiji Muramatsu, Tokorozawa (JP);
Shoji Taniguchi, Tokorozawa (JP);
Akiyoshi Inoue, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 788 days.

(21) Appl. No.: 10/076,602

(22) Filed: Feb. 19, 2002

(65) Prior Publication Data
US 2002/0114233 A1    Aug. 22, 2002

(30) Foreign Application Priority Data
Feb. 19, 2001   (JP)   ............. P2001-042283

(51) Int. Cl.
*G11B 7/00* (2006.01)
*G11B 7/125* (2006.01)

(52) U.S. Cl. .............. 369/47.51; 369/47.1; 369/47.55; 369/53.26

(58) Field of Classification Search ............ 369/47.53, 369/47.43, 47.36, 116, 30.18, 53.11, 59.11, 369/13.26, 53.27, 53.29, 47.51, 53.21, 53.37, 369/44.32, 47.12, 96, 47.39, 59.22, 83, 84, 369/47.26, 47.35, 57.53, 53.1, 59.1, 275.4, 369/275.3, 47.1, 47.55, 53.26, 53.31, 59.25; 705/57; 386/96, 111, 116
See application file for complete search history.

(56) References Cited

U.S. PATENT DOCUMENTS

| 5,072,435 A | * | 12/1991 | Bakx ................. 369/47.53 |
| 5,592,450 A | * | 1/1997 | Yonemitsu et al. ......... 386/96 |
| 5,835,462 A | | 11/1998 | Mimnagh ............. 369/47.39 |
| 5,898,655 A | | 4/1999 | Takahashi ............ 369/47.53 |
| 5,978,322 A | * | 11/1999 | Sugimoto et al. ....... 369/47.26 |
| 5,978,351 A | * | 11/1999 | Spruit et al. ........... 369/275.3 |
| 6,072,759 A | * | 6/2000 | Maeda et al. ........... 369/59.25 |
| 6,549,494 B2 | | 4/2003 | Kobayashi ............. 369/47.1 |
| 6,556,524 B1 | * | 4/2003 | Takeshita ............. 369/47.43 |
| 6,563,775 B2 | * | 5/2003 | Sato .................. 369/47.53 |
| 6,639,890 B1 | * | 10/2003 | Miura et al. ............ 369/116 |
| 6,646,965 B1 | * | 11/2003 | Kim .................. 369/47.53 |

(Continued)

FOREIGN PATENT DOCUMENTS

EP    1 026 669    8/2000

(Continued)

*Primary Examiner*—Hoa Thi Nguyen
*Assistant Examiner*—Kim-Kwok Chu
(74) *Attorney, Agent, or Firm*—Drinker Biddle & Reath LLP

(57) ABSTRACT

In a DVD-R on which information is to be recorded by an information recording apparatus, prior to the recording of the information therein, there are recorded in advance at least identification information for identifying the information recording apparatus for recording the information onto the DVD-R, and recording parameter information containing optimization information for optimizing a recording state in the record processing executed by the information recording apparatus specified by the identification information. Furthermore, the information recording apparatus reads the recording parameter information at the execution of record processing to use it for the record processing.

13 Claims, 6 Drawing Sheets

U.S. PATENT DOCUMENTS

| | | | |
|---|---|---|---|
| 6,687,207 B2 * | 2/2004 | Fukuchi et al. | 369/53.2 |
| 6,724,705 B1 * | 4/2004 | Ko et al. | 369/53.21 |
| 6,725,205 B1 * | 4/2004 | Weiler et al. | 705/57 |
| 6,735,153 B2 * | 5/2004 | Yoshida | 369/30.18 |
| 7,039,295 B1 * | 5/2006 | Moon et al. | 386/95 |
| 7,061,850 B1 * | 6/2006 | Irie et al. | 369/59.24 |
| 7,154,829 B1 * | 12/2006 | Roh | 369/47.55 |
| 2004/0042363 A1 * | 3/2004 | Kobayashi et al. | 369/53.21 |

FOREIGN PATENT DOCUMENTS

| | | |
|---|---|---|
| EP | 1 035 539 | 9/2000 |
| JP | 61-260438 | 11/1986 |
| JP | 63-121130 | 5/1988 |
| JP | 7-93754 | 4/1995 |
| JP | 08-329469 | 12/1996 |
| JP | 09-016964 | 1/1997 |
| JP | 2000-163751 | 6/2000 |
| JP | 2000-293852 | 10/2000 |
| JP | 2002-056536 | 2/2002 |

* cited by examiner

RECORDING MEDIUM, INFORMATION RECORDING APPARATUS, INFORMATION RECORDING METHOD, INFORMATION RECORDING MEDIUM, AND RECORDING PROGRAM

BACKGROUND OF THE INVENTION

1. Field of the Invention

The present invention relates to a recording medium, an information recording apparatus, an information recording method, an information recording medium, and a recording program and in particular to a recording medium on which information is recorded by an information recording apparatus, an information recording apparatus and method for executing the recording, a recording program for allowing a recording computer to execute the record processing and an information recording medium having the recording program recorded in such a manner that the recording computer can read.

2. Description of the Related Art

Recently, the so-called DVDs (Digital Versatile Discs) are widely spread as large-capacity optical discs that can record image information and audio information of all of one movie. Among such DVDs, a DVD-R (DVD-Recordable) and a DVD-RW (DVD-Re-recordable) have been standardized as the recordable DVD.

In this standardization, it is standardized that recording parameter information to be used when optically recording information on the DVD-R or DVD-RW (hereinafter, simply referred to as the DVD-R) is recorded on the DVD-R and the like at a stage in advance when information is not yet recorded, by using the so-called land pre pit (LPP) or the like.

Here, as a typical example of the aforementioned recording parameter information, it is standardized to record a value indicating an intensity of the recording optical beam used for recording information onto the DVD-R or the like. Moreover, the aforementioned stage when information is not yet recorded is, for example, a stage after the production of the DVD-R itself including the time while the DVD-R is displayed in a shop.

In standardization of the conventional DVD-R, as the recording parameter information to be recorded in the DVD-R in the information-not-yet-recorded state, it is noted to record only one type of recording parameter information adaptable to a standard and general information recording apparatus.

However, in the aforementioned conventional DVD-R standardization, since only one type of recording parameter information is recorded as adaptable to a standard and general information recording apparatus, when the DVD-R is mounted on another information recording apparatus for executing record processing, there arises a problem that the record processing cannot be executed in the optimal state.

To solve this problem, theoretically it is possible to record on the information recording apparatus a plurality of recording parameter information items adaptable to a plurality of types of DVD-R. In this case, however, it is practically impossible to answer to a plenty of types of DVD-R. Furthermore, this cannot be applied to a new type of DVD-R which is produced after the development of the information recording apparatus.

On the other hand, there is another method to solve the aforementioned problem. That is, prior to starting actual record processing onto a DVD-R, a test signal is recorded to the DVD-R so as to obtain a recording parameter item optimal to that DVD-R. In this case, however, for obtaining so-called strategy information for rectifying a recording pit shape as one of the recording parameter information items, a complicated processing requiring a plenty of time is required. That is, this method itself is not practical.

SUMMARY OF THE INVENTION

Thus, the present invention has been developed in view of the respective problems, and it is an object of the present invention to provide a DVD-R which can accurately and correctly record information onto the DVD-R by executing the record processing of the information in an optimized recording state for the respective DVD-Rs, even when the record processing is performed onto many types of DVD-Rs; an information recording apparatus and method for performing the record processing and; a recording program for allowing a recording computer to execute the record processing; and an information recording medium in which the recording program is recorded in such a manner that the recording program can be read by the recording computer.

The above object of the present invention can be achieved by a recording medium of the present invention on which information is to be recorded by an information recording apparatus. In the recording medium, prior to the recording of the information therein, there are recorded in advance at least: identification information for identifying the information recording apparatus for recording the information onto the recording medium; and recording parameter information containing optimization information for optimizing a recording state in the record processing executed by the information recording apparatus specified by the identification information.

According to this invention, since identification information for identifying an information recording apparatus to be used for record processing and recording parameter information for optimizing a recording state of the record processing are recorded at a stage prior to actual information recording, it is possible, upon actual record processing, to read out the recorded identification information and the recording parameter information so as to perform information recording onto the recording medium in the optimal state. Further, it is possible to perform information record processing in a recording state optimized in accordance with a recording medium, thereby enabling to accurately and correctly recording information onto the recording medium. Moreover, even when updating a function as an information recording apparatus, by recording in advance on the recording medium the recording parameter information corresponding to the function to be updated, it is possible to reduce the load for the recording updating of the information recording apparatus. Furthermore, even when improving the recording characteristic of the recording medium, it is possible to record in advance the recording parameter information corresponding to the improved characteristic, so that information can be recorded in a recording state optimized for the improved recording characteristic. There is no need of considering compatibility with a previous recording characteristic before improvement of the recording characteristic.

In one aspect of the present invention, the recording parameter information is provided with at least: first recording parameter used when executing the record processing with a first recording speed; and second recording parameter used when executing the record processing with a second recording speed which is faster than the first recording speed.

According to this aspect, since first parameter information for a first recording speed and second parameter information for a second recording speed are recorded in advance, even when record processing is executed at different recording speeds, it is possible to perform the record processing in the optimal state for each of the different recording speeds.

In another aspect of the present invention, the recording medium is provided with at least: an information recording area where the information is to be recorded; and a control information recording area where recording control information used for controlling the record processing is to be recorded; the identification information and the recording parameter information being recorded in the control information area in advance.

According to this aspect, since identification information and recording parameter information are recorded in a control information recording area which is separate from an information recording area where information is recorded, it is possible to execute the record processing optimized, without affecting information to be recorded.

In further aspect of the present invention, standard -recording parameter information is further recorded for executing the record processing in a standard recording state.

According to this aspect, even when an information recording apparatus for executing the record processing has no function to execute record processing under the optimal condition specialized to a recording medium, it is possible to record information by record processing of a standard recording state.

In further aspect of the present invention, in the identification information and the recording parameter information, the identical identification information and the identical recording parameter information are recorded repeatedly.

According to this aspect, since identical identification information and identical recording parameter information are repeatedly recorded, it is possible to accurately detect the identification information and recording parameter information without causing a detection error.

In further aspect of the present invention, a plurality of sets provided with the identification information and the recording parameter information which are in a corresponding relation are recorded.

According to this aspect, since a plurality of sets of identification information and corresponding recording parameter information are recorded, it is possible to select and detect identification information and recording parameter information appropriate for the information recording apparatus on which the recording medium is mounted, thereby enabling to execute record processing in a recording state optimized for each of different information recording apparatuses.

In further aspect of the present invention, the record processing is a record processing executed optically, and the recording parameter information is a recording parameter information for optimizing a shape of a recording pit formed on the recording medium by executing the record processing.

According to this aspect, since recording parameter information for optimizing the recording pit shape is recorded in advance, it is possible to record information so as to minimize a reproduction error during reproduction of the recorded information.

The above object of the present invention can be achieved by an information recording apparatus of the present invention for executing the record processing onto a recording medium on which information is to be recorded by information recording apparatus. In the recording medium, prior to the recording of the information therein, there are recorded in advance at least: identification information for identifying the information recording apparatus for recording the information onto the recording medium; and recording parameter information containing optimization information for optimizing a recording state in the record processing executed by the information recording apparatus specified by the identification information. The apparatus is provided with: a storage device for storing the identification information for identifying the information recording apparatus; a detection device for detecting the identification information and the recording parameter information from the recording medium prior to the recording of the information; a comparison device for comparing the detected identification information to the stored identification information; and a recording device for recording the information onto the recording medium while optimizing the recording state by using the detected recording parameter information when the detected information coincides with the stored identification information.

According to the present invention, the identification information for identifying an information recording apparatus to be used for record processing and the recording parameter information for optimizing the recording state during the record processing have been recorded prior to the actual information recording. Upon a record processing, these are detected and when they are matched with the identification information in the information recording apparatus, the matched recording parameter information is used for executing record processing. Thus, it is possible to execute recording of information in a state optimized for the recording medium. Even when a recording medium mounted is not matched with an information recording apparatus, it is possible to continue recording of information by using a type-corresponding recording parameter. Further, it is possible to perform information record processing in a recording state optimized in accordance with a recording medium, thereby enabling to accurately and correctly recording information onto the recording medium. Moreover, even when updating a function as an information recording apparatus, by recording in advance on the recording medium the recording parameter information corresponding to the function to be updated, it is possible to reduce the load for the recording updating of the information recording apparatus. Furthermore, even when improving the recording characteristic of the recording medium, it is possible to record in advance the recording parameter information corresponding to the improved characteristic, so that information can be recorded in a recording state optimized for the improved recording characteristic. There is no need of considering compatibility with a previous recording characteristic before improvement of the recording characteristic.

In one aspect of the present invention, the apparatus is further provided with a type-corresponding recording parameter information storage device for storing type-corresponding recording parameter information as the recording parameter information corresponding to a type of the recording medium, wherein if the detected identification information does not coincide with the stored identification information, the storage device records the information onto the recording medium by the use of the stored type-corresponding recording parameter information.

According to this aspect, even when a recording medium mounted is a recording medium not appropriate for an information recording apparatus, it is possible to continue recording by using a standard recording parameter.

In another aspect of the present invention, the apparatus is further provided with a standard recording parameter information storage device for detecting/storing standard recording parameter information for executing the record processing in a standard recording state, wherein if the detected identification information does not coincide with the stored identification information, the storage device records the information onto the recording medium by the use of the stored standard recording parameter information.

According to this aspect, even when a recording medium mounted is a recording medium not appropriate for an information recording apparatus, it is possible to continue recording by using a standard recording parameter.

The above object of the present invention can be achieved by an information recording method of the present invention which is executed in an information recording apparatus for executing record processing onto a recording medium on which information is to be recorded by the information recording apparatus, wherein prior to the recording of the information therein, there are recorded in advance at least: identification information for identifying the information recording apparatus for recording the information onto the recording medium; and recording parameter information containing optimization information for optimizing a recording state in the record processing executed by the information recording apparatus specified by the identification information. The method is provided with the processes of: detecting the identification information and the recording parameter information from the recording medium prior to the recording of the information; comparing the detected identification information to the identification information stored in advance in the information recording apparatus and for identifying the information recording apparatus; and recording the information onto the recording medium while optimizing the recording state by using the detected recording parameter information when the detected identification information coincides with the stored identification information.

According to the present invention, the identification information for identifying an information recording apparatus to be used for record processing and the recording parameter information for optimizing the recording state during the record processing have been recorded prior to the actual information recording. Upon a record processing, these are detected and when they are matched with the identification information in the information recording apparatus, the matched recording parameter information is used for executing record processing. Thus, it is possible to execute recording of information in a state optimized for the recording medium. Further, it is possible to perform information record processing in a recording state optimized in accordance with a recording medium, thereby enabling to accurately and correctly recording information onto the recording medium. Moreover, even when updating a function as an information recording apparatus, by recording in advance on the recording medium the recording parameter information corresponding to the function to be updated, it is possible to reduce the load for the recording updating of the information recording apparatus. Furthermore, even when improving the recording characteristic of the recording medium, it is possible to record in advance the recording parameter information corresponding to the improved characteristic, so that information can be recorded in a recording state optimized for the improved recording characteristic. There is no need of considering compatibility with a previous recording characteristic before improvement of the recording characteristic.

The above object of the present invention can be achieved by an information recording medium of the present invention in which a recording program is recorded in such a manner that the recording program can be read by a recording computer contained in an information recording apparatus for executing record processing onto a recording medium on which information is to be recorded by the information recording apparatus, wherein prior to the recording of the information therein, there are recorded in advance at least: identification information for identifying the information recording apparatus for recording the information onto the recording medium; and recording parameter information containing optimization information for optimizing a recording state in the record processing executed by the information recording apparatus specified by the identification information. The program causes the recording computer to function as: a storage device for storing the identification information for identifying the information recording apparatus; a detection device for detecting the identification information and the recording parameter information from the recording medium prior to the recording of the information; a comparison device for comparing the detected identification information to the stored identification information; and a recording device for recording the information onto the recording medium while optimizing the recording state by using the detected recording parameter information when the detected identification information coincides with the stored identification information.

According to the present invention, the identification information for identifying an information recording apparatus to be used for record processing and the recording parameter information for optimizing the recording state during the record processing have been recorded prior to the actual information recording. Upon a record processing, the recording computer is allowed to function in such a way that these information items detected and when they are matched with the identification information in the information recording apparatus, the matched recording parameter information is used for executing record processing. Thus, it is possible to execute recording of information in a state optimized for the recording medium. Further, it is possible to perform information record processing in a recording state optimized in accordance with a recording medium, thereby enabling to accurately and correctly recording information onto the recording medium. Moreover, even when updating a function as an information recording apparatus, by recording in advance on the recording medium the recording parameter information corresponding to the function to be updated, it is possible to reduce the load for the recording updating of the information recording apparatus. Furthermore, even when improving the recording characteristic of the recording medium, it is possible to record in advance the recording parameter information corresponding to the improved characteristic, so that information can be recorded in a recording state optimized for the improved recording characteristic. There is no need of considering compatibility with a previous recording characteristic before improvement of the recording characteristic.

The above object of the present invention can be achieved by a computer data signal embodied in a carrier wave of the present invention. The computer data signal represents executable instructions provided with instructions for executing record processing onto a recording medium on which information is to be recorded by the information recording apparatus, wherein prior to the recording of the information therein, there are recorded in advance at least: identification information for identifying the information recording apparatus for recording the information onto the recording medium; and recording parameter information containing optimization information for optimizing a recording state in the record processing executed by the information recording apparatus specified by the identification information. The computer data signal causes the recording computer to function as: a storage device for storing the identification information for identifying the information recording apparatus; a detection device for detecting the identification information and the recording parameter information from the recording medium prior to the recording of the information; a comparison device for comparing the detected identification information to the stored identification information; and a recording device for recording the information onto the recording medium while optimizing the recording state by using the detected recording parameter information when the detected identification information coincides with the stored identification information.

According to the present invention, the identification information for identifying an information recording apparatus to be used for record processing and the recording parameter information for optimizing the recording state during the record processing have been recorded prior to the actual information recording. Upon a record processing, the recording computer is allowed to function in such a way that these information items detected and when they are matched with the identification information in the information recording apparatus, the matched recording parameter information is used for executing record processing. Thus, it is possible to execute recording of information in a state optimized for the recording medium. Further, it is possible to perform information record processing in a recording state optimized in accordance with a recording medium, thereby enabling to accurately and correctly recording information onto the recording medium. Moreover, even when updating a function as an information recording apparatus, by recording in advance on the recording medium the recording parameter information corresponding to the function to be updated, it is possible to reduce the load for the recording updating of the information recording apparatus. Furthermore, even when improving the recording characteristic of the recording medium, it is possible to record in advance the recording parameter information corresponding to the improved characteristic, so that information can be recorded in a recording state optimized for the improved recording characteristic. There is no need of considering compatibility with a previous recording characteristic before improvement of the recording characteristic.

DETAILED DESCRIPTION OF THE INVENTION

Description will now be directed to preferable embodiments of the present invention with reference to the attached drawings.

It should be noted that in the embodiments explained below, the present invention is applied to record processing in an information recording apparatus that records information including image information onto the aforementioned DVD-R as a recording medium, and to a recording state of the aforementioned recording parameter information that is recorded at a production state of the DVD-R.

Firstly, explanation will be given on two embodiments of the recording state of information (including the aforementioned recording parameter information) in the DVD-R. It should be noted that the recording of the recording parameter information according to the two embodiments explained below is carried out at the DVD-R manufacturing stage and the DVD-R having the recording parameter information recorded according to the embodiments is sold at a store.

(I) DVD-R According to a First Embodiment

Firstly, referring to FIG. 1, FIG. 2, and FIG. 3, explanation will be given on the DVD-R according to a first embodiment.

Figure 1:
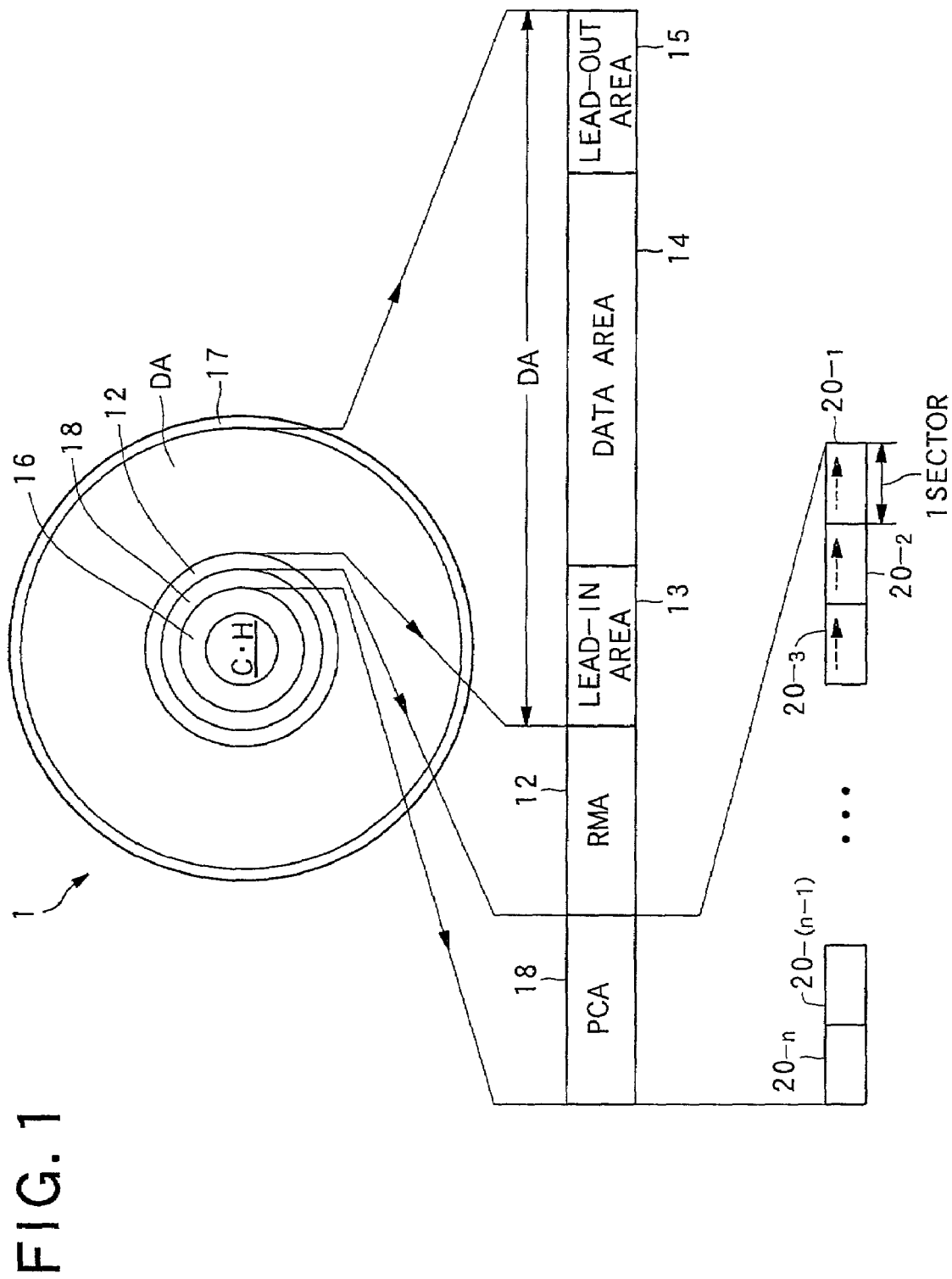
FIG. 1 is a schematic diagram showing a detailed structure of a DVD-R according to an embodiment.

FIG. 1 schematically shows a detailed structure of the DVD-R according to the first embodiment. FIG. 2 and FIG. 3 show a physical format of the recording parameter information recorded on the DVD-R.

As shown in FIG. 1, the DVD-R1 of the first embodiment includes: a clam hole CH provided at the center of the DVD-R1, for mounting and fixing the DVD-R1 on a rotation shaft of a spindle motor in an information recording apparatus which will be detailed later; a reserved area 16 at an inner circumference, where no information is recorded; a power calibration area (PCA) 18; a recording management area (RMA) 12; an information recording area DA; and an end area 17 at an outer circumference where no information is recorded.

Furthermore, the information recording area DA is divided into: a lead-in area 13 containing recording parameter information and the like is (detailed later) to be read out when reproducing the recording information recorded in a data area 14 (detailed later); the data area 14 where the recording information is recorded; and a read-out area 15 containing end information and the like to be read out when completing the reproduction of the recording information recorded in the data area 14. Here, the lead-in area 13 is an area where the start information and the like are recorded when recording information in the data area 14 while the read-out area 15 is an area where the end information and the like are recorded after recording on the entire DVD-R1 is completed (i.e., upon completion of recording of the recording information on the entire DVD-R1).

Here, explanation will be given on the PCA 18 and RMA 12.

In general, when recording information onto the DVD-R1, the information recording is performed by irradiating the DVD-R1 by a recording light beam having intensity modulated according to the information to be recorded. This light beam intensity (hereinafter, simply referred to as recording power) should be readjusted each time information is recorded because the optimal recording power preferable for information recording may be changed due to stains of the recordable DVD-R1 itself, the ambient temperature may be changed, or the reflection ratio of the information recording surface may be changed after a long use.

For this readjusting processing, in the DVD-R1, the PCA 18 and the RMA 12 are arranged inner circumference as compared to the lead-in area 13 of the DVD-R1.

Here, the PCA 12 is divided into a plurality of sectors, so that the aforementioned readjusting processing can be executed by using one or more than one of the sectors. More specifically, in the one or more than one sectors of the PCA 18, while successively increasing the recording power from a predetermined minimum value to a maximum value, setting signals having a random pulse width, for example, from 3T (T is a time unit used upon information recording by an information recording apparatus) to 11T are successively recorded. Next, the setting signals are successively detected and reproduced, starting from the signal recorded with the minimum recording power. During this reproduction, the recording power used for recording the setting signal whose peak level and bottom level are matched for each of the reproduction signals corresponding to the respective pulse width values is set as an optimal recording power of the light beam for the information recording and a light beam of the optimal recording power is used for actual recording of the recording information to be recorded.

The optical recording power thus calculated and a sector number (i.e., number of used sector) of the PCA 18 used for setting the optimal recording power are recorded as a readjustment history in the RMA 12 in such a manner that these can be identified and actual recording of recording information is started.

It should be noted that since information can be recorded only once over the entire surface of the DVD-R1, the sector in the PCA 18 used one for optimization of the recording power cannot be used for a subsequent optimization.

Next, referring back to FIG. 1, a detailed structure of the PCA 18 zero will be explained more specifically. The PCA 18 is divided into the N sectors (for example, N is 7000) 20 and one or more than one of these sectors 20 is used for performing the readjusting processing of the aforementioned recording power.

Moreover, the sectors 20 are successively used, starting with the sector $20_{-1}$ arranged at the outermost circumference.

That is, for example, when performing a readjusting processing using only one sector 20, the recording power is successively increased from the inner circumference toward the outer circumference (shown by a dotted line in FIG. 1) in the sector $20_{-1}$ thereby performing one readjusting processing. In a subsequent readjusting processing, while the recording power is successively increased from the inner circumference toward the outer circumference in a sector $20_{-2}$ (see FIG. 1), the setting signal is recorded.

On the other hand, the RAM can be detailed as follows. The RMA12 has 400 setting recording areas for successively writing at a predetermined timing, the optimal recording power set by the aforementioned readjusting processing and the numbers of the sectors 20 in the PCA 18 used for the readjusting processing.

It should be noted that as has been explained as the conventional technique, in the DVD-R1 of the embodiment, standard recording parameter information having a value appropriate to a standard information recording apparatus has been recorded using the land pre pit, instead of values different for different information recording apparatuses.

Next, referring to FIG. 2 and FIG. 3, explanation will be given on a detailed configuration of the lead-in area 13 having the recording parameter information related to the first embodiment recorded at the manufacturing stage of the DVD-R1.

Figure 2:
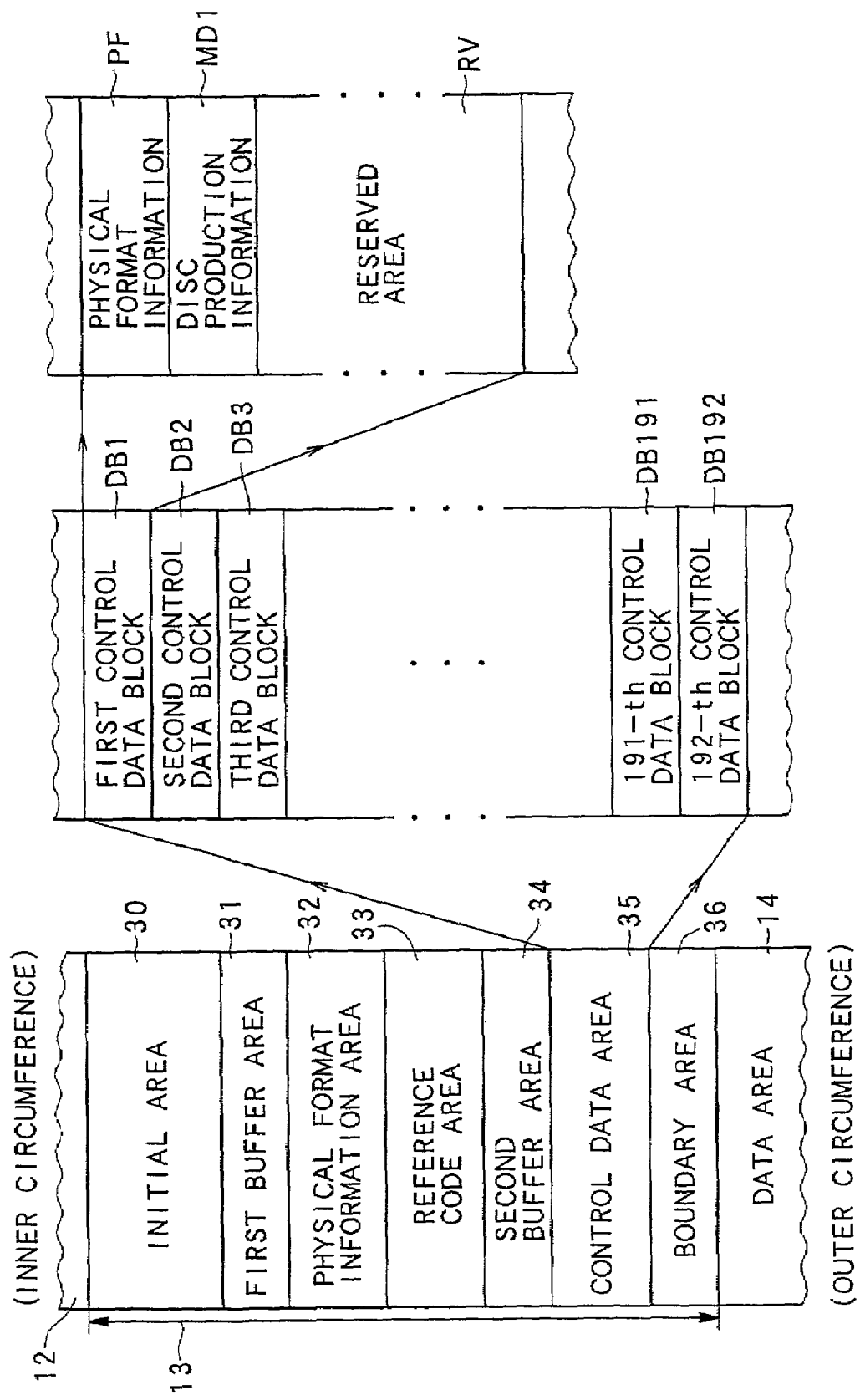
FIG. 2 is a diagram showing a physical format according to a first embodiment.

Firstly, as shown in FIG. 2, lead-in area 13 is divided into: an initial area 30 having all zero data (00h: "h" represents a hexadecimal number); a first buffer area 31 having all zero data; a physical format information area 32 containing physical format information indicating the entire configuration of the physical format in the lead-in area 13; a reference code area 33 containing a reference code to be referenced upon record processing; a second buffer area 34 containing all zero data; a control data area 353 containing the recording parameter information of the present embodiment; and a boundary area 36 containing information facilitating movement of the recording light beam to the aforementioned data area 114; these areas being arranged in this order from inner to outer circumference.

Next, the control data area 35 is divided into 192 control data blocks DB1 to DB192 each having identical information. Here, as will be detailed later, one control data block DB contains recording parameter information and the like which have been recorded by using the so-called phase pit. In the control data area 35, 192 control data blocks DB containing identical parameter information and the like are recorded.

Next, each of the control data blocks DB has a physical format as follows. That is, each of the control data blocks DB is divided into: a physical format information area containing physical format information PF indicating a physical format of the entire control data block DB; a disc manufacturing information area containing disc manufacturing information MD including the recording parameter information of the present embodiment and having a 2048-byte information amount; and a reserved area RV containing no information recorded. These three areas are formed in this order viewed from the inner circumference.

Figure 3:
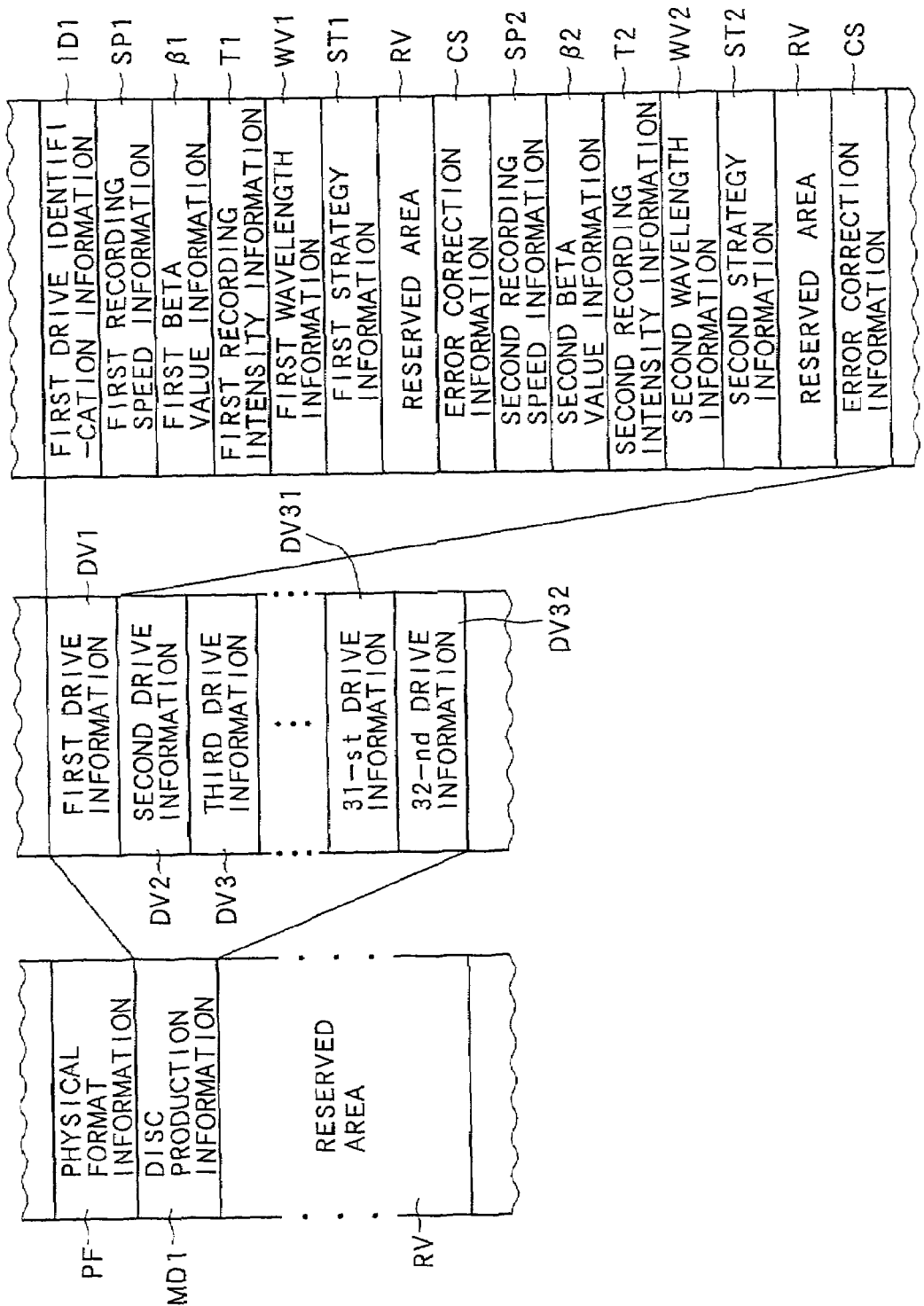
FIG. 3 is a diagram also showing a physical format of a first embodiment.

Furthermore, referring to FIG. 3, the area containing the disc manufacturing information MD has the areas containing 32 drive information blocks DV1 to DV32 respectively, each containing recording parameter information appropriate for different types information recording apparatuses. Thus, within an area having one disc manufacturing information MD contains recording parameter information appropriate for 32 types of information recording apparatuses.

Each area containing one drive information block DV has: an area containing first drive identification information ID1 for identifying a first information recording apparatus (more specifically, indicating a type number of the first information recording apparatus and the like); an area containing first recording, speed information SP1 indicating a first recording speed (for example, speed multiplied by 1) of the record processing executed in the first information recording apparatus; an area containing a first beta value information β1 indicating a beta β value appropriate for the first recording speed which will be detailed later; an area containing a first recording intensity information T1 indicating the recording light beam intensity appropriate for the first recording speed; an area containing first wavelength information WV1 indicating a wavelength of the recording light beam appropriate for the first recording speed; an area containing first strategy information ST1 indicating strategy information appropriate for the first recording speed which will be detailed later; a reserved area RV having no information recorded; an area containing error correction information CS for correcting an error caused while detecting the first recording speed information SP1, the first beta value information β1, the first recording intensity information T1, the first wavelength information WV1, and the first strategy information ST1; an area containing second recording speed information SP2 indicating a second recording speed (for example, speed multiplied by 2) of the record processing executed in the first information recording apparatus; an area containing a second beta value information β2 indicating a beta value appropriate for the second recording speed which will be detailed later; an area containing a second recording intensity information T2 indicating the recording light beam intensity appropriate for the second recording speed; an area containing a second wavelength information WV2 indicating a wavelength of the recording light beam appropriate for the second recording speed; an area containing second strategy information ST2 indicating strategy information appropriate for the second recording speed which will be detailed later; a reserved area RV having no information recorded; and an area containing error correction information CS for correcting an error caused while detecting the second recording speed information SP2, the second beta value information β2, the second recording intensity information T2, the second wavelength information WV2, and the second strategy information ST2. These areas are successively arranged in this order viewed from the inner circumference of the DVD-R1.

Here, explanation will be given on the aforementioned beta value. The beta value is based on a maximum peak value and a minimum peak value of the detection signal created according to the reflection light from the DVD-R1. That is, the beta value is a value that sum of the maximum peak value and the minimum peak value is divided by a difference between the maximum value and the minimum value. The beta value indicates a deviation of a recording power.

Moreover, the strategy information is information on a time axis for modifying a wave form (i.e., the rising timing and the trailing timing of a rectifying pattern signal Ssr which will be detailed later), so as to obtain a preferable form of a recording pit formed on the DVD-R1.

As is clear from the aforementioned series of the physical format, as the recording parameter information recorded in the DVD-R1 of the first embodiment, the recording parameter information is recorded corresponding to two recording speed values for one information recording apparatus, and the two recording parameter information items are recorded for 32 types of information recording apparatus.

(II) Second Embodiment of DVD-R

Next, explanation will be given on the DVD-R according to the second embodiment with reference to FIG. 4.

Figure 4:
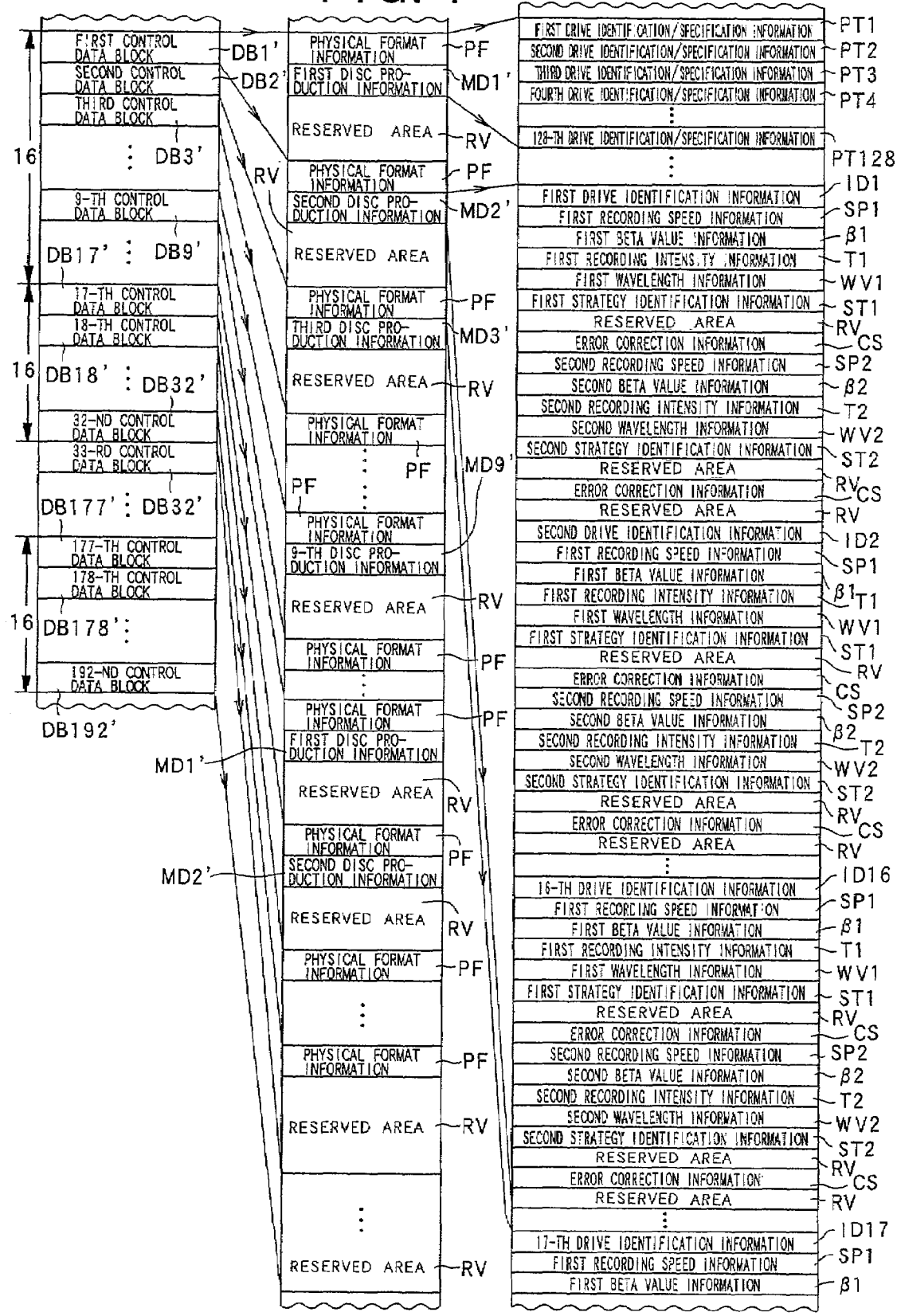
FIG. 4 a diagram showing a physical format of according to a second embodiment.

It should be noted that FIG. 4 shows a physical format of the recording parameter information recorded on the DVD-R of the second embodiment.

Moreover, in the DVD-R of the second embodiment, a hierarchy above the control data block DB has identical configuration as the first embodiment and its detailed explanation is omitted.

As shown in FIG. 4, in the DVD-R of the second embodiment, similarly as in the first embodiment, 192 control data blocks DB' are formed. However, in the DVD-R of the second embodiment, 16 control data blocks DB' are handled as one group and identical information is repeatedly recorded 12 times (192/16=12).

One control data block DB' of each group of 16 control data blocks' has: an area containing physical format information PF identical as the one in the first embodiment; an area containing recording parameter information of the embodiment and 2048-byte disc manufacturing information MD'; and a reserved area RV having no information recorded. These areas are arranged in this order viewed from the inner circumference.

Here, in each group of 16 control data blocks DB', the first control data block DB1' to the 9-th control data block DB9' contain different disc manufacturing information items MD' while the 10-th to the 16-th control data blocks contain only the aforementioned physical format information PF: The other control data blocks DB' are all reserved information RV areas.

Next, the first disc manufacturing information MD1' contains first drive identification/specification information PT1 to 128-th drive identification/specification information PT128, each of which indicates a recording position on the DVD-R having the recording parameter information (such as the first drive identification information ID1) appropriate for the first to 128-th information recording apparatuses in this order viewed from the inner circumference of the DVD-R.

Furthermore, the area containing the second disc production information MD2' has: an area containing first drive identification information ID1 for identifying a first information recording apparatus; an area containing first recording speed information SP1 indicating a first recording speed (for example, speed multiplexed by 1) of the record processing executed in the first information recording apparatus; an area containing a first beta value information β1 indicating a beta β value appropriate for the first recording speed; an area containing a first recording intensity information T1 indicating the recording light beam intensity appropriate for the first recording speed; an area containing first wavelength information WV1 indicating a wavelength of the recording light beam appropriate for the first recording speed; an area containing first strategy information ST1 indicating strategy information appropriate for the first recording speed; a reserved area RV having no information recorded; an area containing error correction information CS for correcting an error caused while detecting the first recording speed information SP1, the first beta value information β1, the first recording intensity information T1, the first wavelength information WV1, and the first strategy information ST1; an area containing second recording speed information SP2 indicating a second recording speed (for example, speed multiplied by 2) of the record processing executed in the first information recording apparatus; an area containing a second beta value information β2 indicating a beta value appropriate for the second recording speed which will be detailed later; an area containing a second recording intensity information T2 indicating the recording light beam intensity appropriate for the second recording speed; an area containing a second wavelength information WV2 indicating a wavelength of the recording light beam appropriate for the second recording speed; an area containing second strategy information ST2 indicating strategy information appropriate for the second recording speed which will be detailed later; a reserved area RV having no information recorded; and an area containing error correction information CS for correcting an error caused while detecting the second recording speed information SP2, the second beta value information β2, the second recording intensity information T2, the second wavelength information WV2, and the second strategy information ST2. These areas are successively arranged in this order viewed from the inner circumference of the DVD-R. After this up to the 16-th information recording apparatuses, as shown in FIG. 4, i.e., for each of the 16 types of information recording apparatuses, recording parameter information is recorded so as to correspond two recording speed values.

After this up to the 9-th control data block DB9', the recording parameter information for the 16 types of information recording apparatuses is recorded with two recording speed values.

Accordingly, as is clear from the aforementioned series of physical format, the recording parameter information stored in the DVD-R of the second embodiment includes recording parameter information corresponding to two recording speed values for each of 128 types of information recording apparatuses.

(III) Information Recording Apparatus According to an Embodiment

Next, referring to FIG. 5 and FIG. 6, explanation will be given on configuration and operation of an information recording apparatus according to the embodiment that stores recording information onto the DVD-R having the recording parameter information recorded in the aforementioned physical format.

Figure 5:
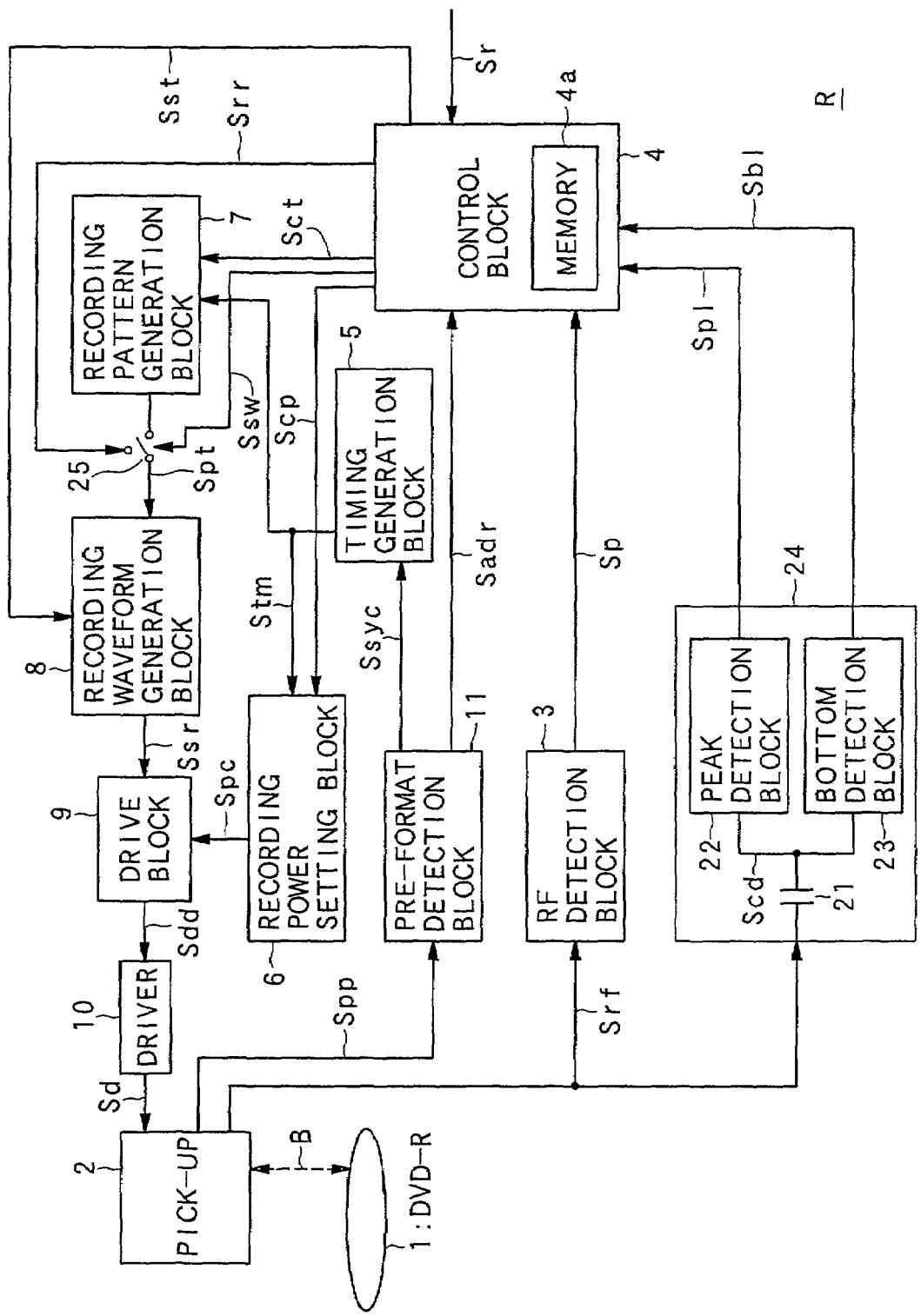
FIG. 5 is a block diagram showing a configuration outline of an information recording apparatus according to an embodiment.
Figure 6:
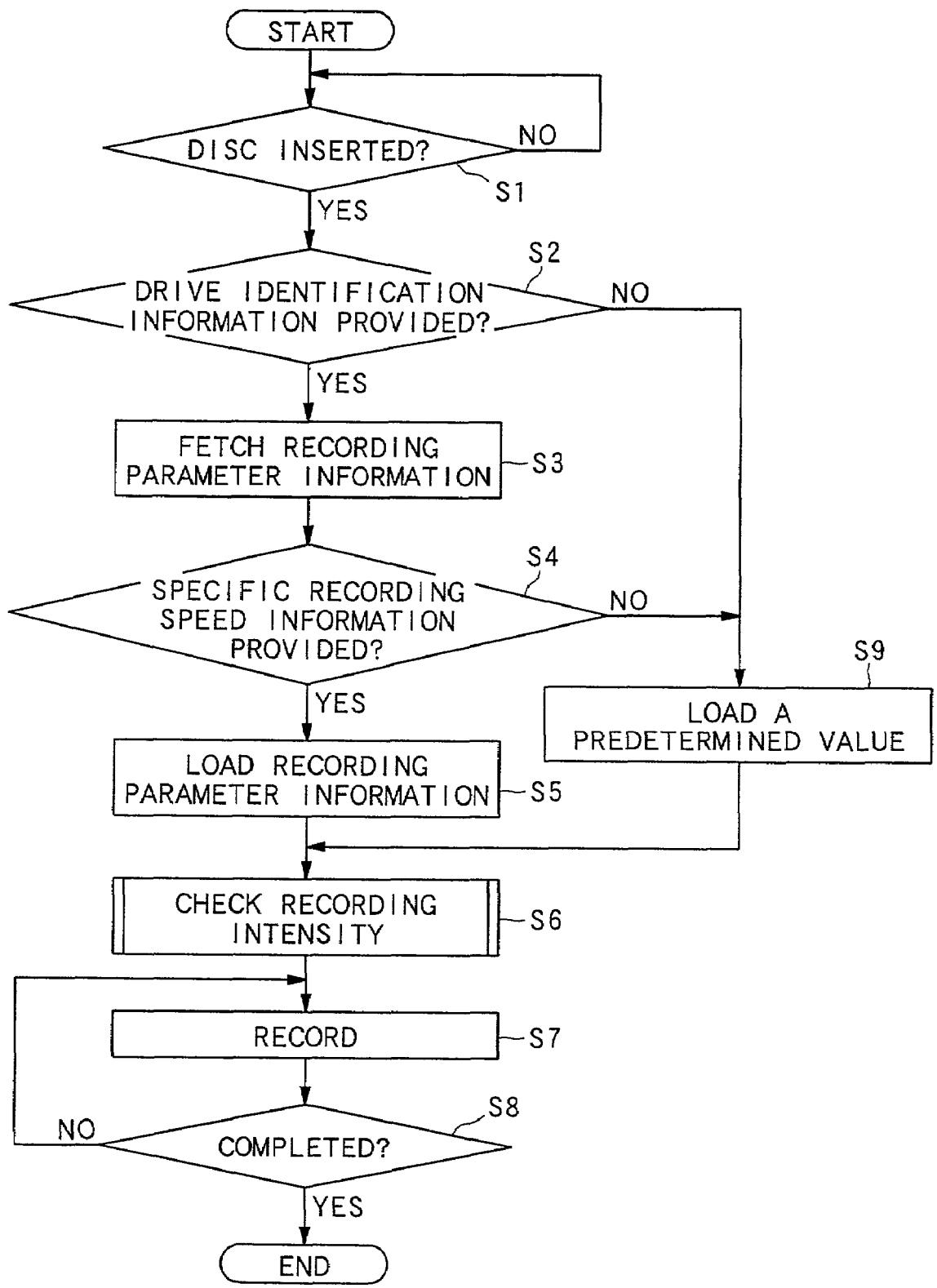
FIG. 6 is a flowchart showing a recording process according to an embodiment.

It should be noted that FIG. 5 is a block diagram showing an outline of the configuration of the information recording apparatus according to the present embodiment and FIG. 6 is a flowchart showing a record processing executed in the information recording apparatus.

As shown in FIG. 5, the information recording apparatus R according to the present embodiment is comprised of: a pick-up 2 as the detection means and the recording means; a radio frequency (RF) detection block 3; a control block 4 comprised of a CPU, having a built-in memory 4a as the storage means, type-corresponding recording parameter information storage means, and standard recording parameter information storage means, and functioning as comparison means and a recording computer; a timing generation block 5; a recording power setting block 6; a recording pattern generation block 7; a recording waveform generation block 8; a drive block 9; a driver 10; a pre-format detection block 11; a level detection block 24 including a capacitor 21, a peak detector 22, and a bottom detector 23; and a switch 25.

Here, the aforementioned memory 4a contains recording parameter information matched with predetermined several types of DVD-R1, drive identification information for identifying the information recording apparatuses R, and recording parameter information appropriate a standard information recording apparatus.

Next, explanation given on operation of the respective components.

Firstly, explanation will be given on general operation in the information record processing.

The DVD-R1 has address information indicating the recording position of the information on the DVD-R1, a synchronization signal, and the like recorded in advance (at the manufacturing stage) by forming a land pre pit as has been explained above.

When recording information on the DVD-R1, firstly, the pick-up 2 applies information recording light beam B to the pre pit immediately before the actual information recording, detects: the address information indicating the recording position of the recording information entered from outside to be recorded; and synchronization signal to generate a recording clock signal (whose cycle is based on the afore-mentioned unit time T) to be used as a reference clock in this record processing, by means of, for example, the push-pull method, and creates a push-pull signal Spp including these, which is output to the pre-format detection block 11.

The pre-format detection block 11 isolates the aforementioned synchronization signal Ssyc and the address information Sadr from the push-pull signal Spp and outputs the synchronization signal Ssyc to the timing generation block 5 and the address information Sadr to the control block 4.

The timing generation block 5 generates the aforementioned recording clock signal Stm based on the synchronization signal Ssyc and outputs the signal to the recording power setting block 6 and to the recording pattern generation block 7.

On the other hand, the recording signal Sr entered from outside is input to the control block 4.

The control block 4 processes the entered recording information Sr by adding an error correction code and modulating the recording information Sr and according to the address information Sadr, identifies the recording position on the DVD-R1 where the entered recording information Sr is to be recorded. Furthermore, the control block 4 outputs the processed recording signal Sr as a recording signal Srr to recording waveform generation block 8, at the timing corresponding to the recording position via the switch 25, which has been switched to the control block 4 by a switch control signal Ssw from the control block 4.

On the other hand, during the adjusting processing, the recording pattern generation block 7 uses the control signal Sct from the control block 4 to create a recording pattern signal Spt having a random pulse width of 3T to 11T using the recording clock signal Stm as a reference clock and outputs the recording pattern signal Spt to the recording waveform generation block 8 via the switch 25 which has been switched to the recording pattern generator 7 by the switch control signal Ssw from the control block 4.

The recording waveform generation block 8 uses a strategy control signal Sst from the control block 4 corresponding to the aforementioned respective strategy information ST to perform the waveform rectifying processing (so-called strategy processing) for rectifying and optimizing the recording pit shape formed on the DVD-R1 recording track corresponding to the waveform of the recording pattern signal Spt with respect to the recording signal Srr or the recording pattern signal Spt, thereby creating a rectification pattern signal Ssr and outputting the signal Ssr to the drive block 9.

On the other hand, the recording power setting block 6 uses the control signal Scp from the control block 4 to create a power signal Spc indicating the recording power set by the recording power setting processing executed by using the aforementioned recording parameter information prior to the information recording and outputs the power signal Spc to the drive block 9.

The drive block 9 generates a drive signal Sdd for applying recording light beam B with the recording power indicated by the power signal Spc and outputs the drive signal Sdd to the driver 10.

Thus, the driver 10 drives a semiconductor laser (not depicted) in the pick-up 2 to generate a drive signal Sd for applying the aforementioned recording light beam B whose intensity has been modulated according to the waveform change indicated by the rectification pattern signal Ssr based on the recording power indicated by the aforementioned power signal Spc, and outputs the drive signal Sd to the semiconductor laser in the pick-up 2.

When the semiconductor laser is driven by the drive signal Sd, the recording light beam B corresponding to the original recording information Sr is applied to the DVD-R1 and a recording pit corresponding to the recording information Sr is formed on the recording tradck of trhe DVD-R1, thereby completing a series of the record processing of the recording information Sr.

Next, referring to FIG. 6, detailed explanation will be given on the record processing using the recording parameter information according to the present embodiment performed around the control block 4.

As shown in FIG. 6, in the record processing using the recording parameter information according to the present embodiment, firstly, it is checked whether the DVD-R1 is inserted into the information recording apparatus R (step S1). If not inserted (NO in step 1), then wait state continues until the DVD-R1 is inserted. If inserted (YES in step S1), the aforementioned drive identification information ID is successively detected from the inserted DVD-R1 and compared to the drive identification information used to identify the information recording apparatus R stored in memory 4a in advance. Then, check is made to determine whether the inserted DVD-R1 has a drive identification information ID appropriate to the information recording apparatus R (step 2).

If the drive identification ID is recorded (YES in step 2), then another recording parameter information recorded on the DVD-R1 and appropriate for the information recording apparatus R is detected (step S3) and check is made to determine whether the aforementioned detected recording parameter information contains the recording speed information SP corresponding to the recording speed specified by a user (step S4).

Next, if the recording speed information corresponding to the specified recording speed is contained (YES in step S4), then the aforementioned recording parameter information containing the recording speed information SP is set in the control block 4 (step S5), adjusting processing of the recording power (detailed later) is performed using the aforementioned PCA 18 and RMA 12 (step S6), and actual information recording is performed (step S7).

Next, check is made whether all the information recording is completed (step S8). If not completed (NO in step S8), control is passed back to step S7 to continue the information recording. If completed (YES in step S8), the processing is terminated.

On the other hand, when the drive identification information ID appropriate to the information recording apparatus R is not recorded in step S2 (NO in step 2), or when the recording speed information SP corresponding to the specified is not contained in step S4 (NO in step S4), one of the recording parameter information items recorded in advance in the memory 4a is set in the control block 4 (step S9) and record processing is executed using the recording parameter information (step S6).

It should be noted that instead of the processing of step S9, it is also possible to read out the standard recording parameter information from the DVD-R1 using the land pre pit and set the information in the control block 4.

Next, referring back to FIG. 5, explanation will be given on the recording power adjusting processing in the aforementioned step S6.

As has been described above, the adjusting processing of step S6 is executed by using the PCA 18 and RMA 12 formed on the inner side of the lead-in area of the DVD-R1.

In the adjusting processing using the PCA 18 and RMA 12, for example, when one adjusting processing is performed using only the aforementioned sector 20, firstly, the control block 4 outputs the control signal Sct to the recording pattern generation block 7 so as to create a recording pattern signal Spt having a random pulse width of 3T to 11T.

On the other hand, the control block 4 outputs the aforementioned control signal Scp to control the recording power setting block 6 so that the setting signal is recorded with successively increasing the recording power from the inner circumference to the outer circumference (see the dotted line in FIG. 1).

Thus, the recording power setting block 6 outputs the power signal Spc so as to successively increase the recording power.

According to the power signal Spc, the drive block 9 and the driver 10 successively record the setting signal in the sector $20_{-1}$ while increasing the recording power. By this processing, in the sector $20_{-1}$, the setting signal is recorded whose reproduction intensity is increased in a stepped way.

Next, a detection signal Srf is obtained by reproducing the setting signal recorded in the stepped way, using the pick-up 2 and the peak level and the bottom level of the detection signal Srf are detected by the level detection block 24.

Here, the level detection block 24 removes a DC component of the detection signal Srf by the capacitor 21, detects the peak level and the bottom level of the capacitor signal Scd output by the peak detector 22 and the bottom detector 23, respectively, and outputs the peak level signal Sp1 and the bottom level signal Sb1 to the control block 4.

Based on the peak level signal Sp1 and the bottom level signal Sb1, the control block 4 sets as an optimal recording power a recording power, used when recording setting signal whose peak level is matched with the bottom level for each of the detection signals Srf corresponding to the pulse width of 3T to 11T, in a memory (not depicted) or the like and uses the recording power for actual recording processing.

As has been described above, according to the physical format and the operation of the information recording apparatus R in the DVD-R1 of the embodiment, the drive identification information ID for identifying the information recording apparatus R used for record processing and the recording parameter information for optimizing the recording state of the record processing are recorded in advance before actual information recording. Accordingly, by reading out and using the drive identification information ID and the recording parameter information, it is possible to record the information in the recording medium in an optimal state.

Moreover, the first recording parameter information for the first recording speed and the second recording parameter information for the second recording speed are recorded in advance. Accordingly, even when performing the record processing with different recording speeds, the record processing can be performed in a optimized state for each of the speeds.

Furthermore, the drive identification information ID and the recording parameter information are recorded in the lead-in area 13 which is different from the data area 14 where information is to be recorded. Accordingly, it is possible to optimize the record processing without affecting the information to be recorded.

Furthermore, the recording parameter information for executing recording by the standard recording state is recorded by the pre bit. Accordingly, even when the information recording apparatus which executes record processing does not have the function for executing recording onto a recording medium under the optimal condition, it is possible to record the information in the standard recording state.

Moreover, identical drive identification information ID and the recording parameter information are repeatedly recorded. Accordingly, it is possible to accurately detect the identification information and the recording parameter information without causing a detection error.

Furthermore, a plurality of sets of the drive identification information ID and the corresponding recording parameter information are recorded. Accordingly, by selecting/detecting the identification information and the recording parameter information appropriate for an information recording apparatus R on which the DVD-R1 is mounted, it is possible to perform record processing in a recording state optimized for each of the information recording apparatuses R of different types.

Moreover, the strategy information ST for optimizing the recording pit shape is recorded in advance. Accordingly, it is possible to record information while minimizing occurrence of a reproduction error during reproduction of the recorded information.

It should be noted that in the aforementioned embodiment of the present invention, explanation has been given on DVD-R1 where information can be recorded only once. However, the present invention can also be applied to a DVD-RW where information can be rewritten several times. In this case, the record processing onto the DVD-RW shown in FIG. 6 can omit step S6.

Moreover, a general-purpose personal computer and the like can also operate as the aforementioned control block 4 by recording a program corresponding to the flowchart shown in FIG. 6, onto an information recording medium such as a flexible disc or a hard disc and reading out and executing the program.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-42283 filed on Feb. 19, 2001 including the specification, claims, drawings and summary is incorporated herein by reference in its entirety.

What is claimed is:

1. An optical recording medium on which information is to be recorded by one of a plurality of different information recording apparatuses, wherein at the time of manufacturing the recording medium, there are recorded in advance at least:
    identification information for identifying from a plurality of different information recording apparatuses, an identified information recording apparatus for recording the information onto the optical recording medium; and
    recording parameter information containing optimization information for optimizing a recording state in the record processing executed by the information recording apparatus specified by the identification information,
    wherein a plurality of sets of identification information and corresponding recording parameter information are recorded on the optical recording medium.

2. The optical recording medium according to claim 1, wherein the recording parameter information comprises at least:
    first recording parameter used when executing the record processing with a first recording speed; and
    second recording parameter used when executing the record processing with a second recording speed which is faster than the first recording speed.

3. The optical recording medium according to claim 1, wherein the optical recording medium comprises at least:
    an information recording area where the information is to be recorded; and
    a control information recording area where recording control information used for controlling the record processing is to be recorded;
    the identification information and the recording parameter information being recorded in the control information area in advance.

4. The optical recording medium according to claim 1, wherein standard recording parameter information is further recorded for executing the record processing in a standard recording state.

5. The optical recording medium according to claim 1, wherein in the identification information and the recording parameter information, the identical identification information and the identical recording parameter information are recorded repeatedly.

6. The optical recording medium according to claim 1, wherein a plurality of sets comprising the identification information and the recording parameter information which are in a corresponding relation are recorded.

7. The optical recording medium according to claim 1, wherein the record processing is a record processing executed optically, and
    the recording parameter information is a recording parameter information for optimizing a shape of a recording pit formed on the optical recording medium by executing the record processing.

8. An information recording apparatus for executing the record processing onto an optical recording medium on which information is to be recorded by one of a plurality of different information recording apparatuses, wherein at the time of manufacturing the optical recording medium, there are recorded in advance at least:
    identification information for identifying from a plurality of different information recording apparatuses, an identified information recording apparatus for recording the information onto the optical recording medium; and
    recording parameter information containing optimization information for optimizing a recording state in the record processing executed by the information recording apparatus specified by the identification information, wherein a plurality of sets of identification information and corresponding recording parameter information are recorded on the optical recording medium, said apparatus comprising:
    a storage device for storing the identification information for identifying the information recording apparatus;
    a detection device for detecting the identification information and the recording parameter information from the optical recording medium prior to the recording of the information;
    a comparison device for comparing the detected identification information to the stored identification information; and
    a recording device for recording the information onto the optical recording medium while optimizing the recording state by using the detected recording parameter information when the detected information coincides with the stored identification information.

9. The information recording apparatus according to claim 8, further comprising a type-corresponding recording parameter information storage device for storing type-corresponding recording parameter information as the recording parameter information corresponding to a type of the optical recording medium, wherein if the detected identification information does not coincide with the stored identification information, the storage device records the information onto the optical recording medium by the use of the stored type-corresponding recording parameter information.

10. The information recording apparatus according to claim 8, further comprising a standard recording parameter information storage device for detecting/storing standard recording parameter information for executing the record processing in a standard recording state, wherein if the detected identification information does not coincide with the stored identification information, the storage device records the information onto the optical recording medium by the use of the stored standard recording parameter information.

11. An information recording method which is executed in an information recording apparatus for executing record processing onto an optical recording medium on which information is to be recorded by one of a plurality of different information recording apparatuses, wherein at the time of manufacturing the recording medium, there are recorded in advance at least: identification information for identifying from a plurality of different information recording apparatuses, an identified information recording apparatus for recording the information onto the optical recording medium; and recording parameter information containing optimization information for optimizing a recording state in the record processing executed by the information recording apparatus specified by the identification information, wherein a plurality of sets of identification information and corresponding recording parameter information are recorded on the optical recording medium, said method comprising the processes of:

detecting the identification information and the recording parameter information from the optical recording medium prior to the recording of the information;

comparing the detected identification information to the identification information stored in advance in the information recording apparatus and for identifying one of the plurality of different information recording apparatuses, the identified information recording apparatus for recording the information onto the optical record medium; and recording the information onto the optical recording medium while optimizing the recording state by using the detected recording parameter information when the detected identification information coincides with the stored identification information.

12. An optical information recording medium in which a recording program is recorded in such a manner that the recording program can be read by a recording computer contained in an information recording apparatus for executing record processing onto an optical recording medium on which information is to be recorded by one of a plurality of different information recording apparatuses, wherein at the time of manufacturing the optical recording medium, there are recorded in advance at least: identification information for identifying from a plurality of different information recording apparatuses, an identified information recording apparatus for recording the information onto the optical recording medium; and recording parameter information containing optimization information for optimizing a recording state in the record processing executed by the information recording apparatus specified by the identification information, wherein a plurality of sets of identification information and corresponding recording parameter information are recorded on the optical recording medium, said program causing the recording computer to function as:

a storage device for storing the identification information for identifying the information recording apparatus;

a detection device for detecting the identification information and the recording parameter information from the optical recording medium prior to the recording of the information;

a comparison device for comparing the detected identification information to the stored identification information; and a recording device for recording the information onto the optical recording medium while optimizing the recording state by using the detected recording parameter information when the detected identification information coincides with the stored identification information.

13. A computer data signal embodied in a carrier wave and representing executable instructions comprising instructions for executing record processing onto an optical recording medium on which information is to be recorded by one of a plurality of different information recording apparatuses, wherein at the time of manufacturing the optical recording medium, there are recorded in advance at least: identification information for identifying from a plurality of different information recording apparatuses, an identified information recording apparatus for recording the information onto the optical recording medium; and recording parameter information containing optimization information for optimizing a recording state in the record processing executed by the information recording apparatus specified by the identification information, wherein a plurality of sets of identification information and corresponding recording parameter information are recorded on the optical recording medium, said computer data signal causing the recording computer to function as:

a storage device for storing the identification information for identifying the information recording apparatus;

a detection device for detecting the identification information and the recording parameter information from the optical recording medium prior to the recording of the information;

a comparison device for comparing the detected identification information to the stored identification information; and a recording device for recording the information onto the optical recording medium while optimizing the recording state by using the detected recording parameter information when the detected identification information coincides with the stored identification information.

* * * * *